US012151197B2

(12) United States Patent
Dinsdale et al.

(10) Patent No.: US 12,151,197 B2
(45) Date of Patent: Nov. 26, 2024

(54) CONDENSATE RECOVERY UNIT (71) Applicant: CONOCOPHILLIPS COMPANY, Houston, TX (US)

(72) Inventors: Travis O. Dinsdale, Calgary (CA); James Kadar, Calgary (CA); Jonathan J. Kiesewetter, Calgary (CA); Dale L Embry, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 17/464,990

(22) Filed: Sep. 2, 2021

(65) Prior Publication Data

US 2022/0062811 A1 Mar. 3, 2022

Related U.S. Application Data (60) Provisional application No. 63/073,763, filed on Sep. 2, 2020.

(51) Int. Cl.
*B01D 53/00* (2006.01)
*B01D 3/06* (2006.01)
*B01D 5/00* (2006.01)

(52) U.S. Cl.
CPC ............. *B01D 53/002* (2013.01); *B01D 3/06* (2013.01); *B01D 5/0003* (2013.01); *B01D 5/0036* (2013.01); *B01D 5/006* (2013.01)

(58) Field of Classification Search
CPC ........ B01D 3/06; B01D 3/143; B01D 5/0003; B01D 5/0036; B01D 5/006; B01D 53/002; C10G 7/00; C10L 1/04
See application file for complete search history.

(56) References Cited

U.S. PATENT DOCUMENTS

| 4,131,538 | A  | 12/1978 | Rose et al. |
| 6,357,526 | B1 | 3/2002  | Abdel-Halim et al. |
| 7,172,686 | B1 | 2/2007  | Ji et al. |
| 8,070,840 | B2 | 12/2011 | Diaz et al. |

(Continued)

FOREIGN PATENT DOCUMENTS

| CA | 2904901 A1    | 3/2016  |
| GB | 1061208       | 3/1967  |
| WO | 2013173907 A1 | 11/2013 |

OTHER PUBLICATIONS

McCain, Jr., W., 2017, Properties of Petroleum Fluids, 3rd ed., PennWell, 592 pp, (Office action cites p. 122). (Year: 2017).*

(Continued)

*Primary Examiner* — Brian A McCaig
(74) *Attorney, Agent, or Firm* — CONOCOPHILLIPS COMPANY (57) ABSTRACT

Production equipment and methods which reduce "gray" or off-specification production and improve central processing facility (CPF) efficiency. The process is a combination of unit operations (heat exchange, pumping, and separation) to produce an on-spec gas product, an on-spec condensate product, and/or on-spec oil product. It does so by placing the feed under pressure and heating it to the point that it can be vaporized and separated. The blended components are modulated dependent upon the composition of the produced fluids, produced gas, and off-specification fluid to efficiently produce on-specification products.

14 Claims, 7 Drawing Sheets

Overall System Block Flow Diagram (56) References Cited

U.S. PATENT DOCUMENTS

| | | |
|---|---|---|
| 8,951,406 B2 | 2/2015 | Koseoglu |
| 2007/0045265 A1 | 3/2007 | McKinzie, II |
| 2015/0014120 A1 | 1/2015 | Klein et al. |
| 2019/0161692 A1 | 5/2019 | Mani et al. |

OTHER PUBLICATIONS

Hoffman, A.E. et al., 1953, Petroleum Transactions, AIME, T.P. 3493, 10 pp. (Year: 1953).*
International Search Report for PCT/US2021/048815 mailed Jan. 6, 2022; 3 pgs.
1 European Search Report received Jul. 14, 2023; 4 pgs.

* cited by examiner

Overall System Block Flow Diagram
FIG. 1

Simulation Overview to Create Correct Effluent Stream Composition
FIG. 2

System Sketch of Single Stage Heat and Flash Scheme

FIG. 3

System Sketch of Two Stage Heat and Flash Scheme

FIG. 4

System Sketch of Distillation Configuration to separate Light Condensate and Light Oil.

FIG. 7 Process Flow Diagram Tower

FIG. 8
Process Flow Diagram Overhead Drum

FIG. 9

Process Flow Diagram Condensate and Light Oil Blending

CONDENSATE RECOVERY UNIT

CROSS-REFERENCE TO RELATED APPLICATIONS

This application is a non-provisional application which claims benefit under 35 USC § 119(e) to U.S. Provisional Application Ser. No. 63/073,763 filed Sep. 2, 2020, entitled "CONDENSATE RECOVERY UNIT," which is incorporated herein in its entirety.

STATEMENT REGARDING FEDERALLY SPONSORED RESEARCH

None.

FIELD OF THE INVENTION

The present invention relates generally to crude oil, light crude oil, wet gas and natural gas condensate production. More particularly, but not by way of limitation, embodiments of the present invention include production equipment and methods which convert "gray" or off-specification production that does not meet typical light oil product specifications and also does not meet typical condensate product specifications. The embodiments of the present invention function by conversion of the produced hydrocarbon liquid to two or more hydrocarbon product streams meeting product specifications for typical light oil, condensate, distillate or other marketable hydrocarbon products.

BACKGROUND OF THE INVENTION

In the process of producing petroleum from hydrocarbon reservoirs, petroleum is a complex mixture of hydrocarbons and a variety of products may be produced ranging from solids to gases including methane, natural gas, naphtha, light oil, oil, heavy oil, condensate, waxes, heavy oils, tars, bitumens, and the like. Hydrocarbons can be as simple as methane ($CH_4$), but many produced fluids are mixtures of highly complex molecules of gases, liquids, and/or solids. The molecules can have the shape of chains, branching chains, rings or other structures. Produced hydrocarbons are divided into broad and overlapping classifications based on the products produced, average weight, range, and composition of the hydrocarbons.

Unfortunately, some "grey" fractions may possess properties that fall between product specifications, whilst not meeting all criteria for any single sales product. These grey fraction products cannot readily be transported to petroleum markets due to noncompliance with product specifications. Because the grey fractions cannot readily enter the petroleum market, there is a risk the product may be "stranded." A stranded product is one that is too expensive to transport as is, but cannot enter standard and much less expensive transportation systems, and cannot be sold to market as it does not fall into a defined hydrocarbon quality specification. The stranded product leads to multiple inefficiencies that increase cost and risk. For example, transporting a stranded product by truck may cause exhaust and risk of spillage that would not be present if the product could be transported by pipeline. Likewise, if the product is too difficult to get into a hydrocarbon market, it may be considered waste and have to be disposed of or sold at a greatly reduced rate.

What is needed is an effective and cost-efficient manner to get grey products to achieve the appropriate physical and chemical properties without adding expensive components or dramatically increasing energy requirements.

BRIEF SUMMARY OF THE DISCLOSURE

The invention more particularly includes a process for treating produced fluids that are off-specification, when off-specification fluid is received from the production wells; the off-specification fluid is heated to a flashing temperature where components of the off-specification fluid will partially vaporize; flashing the off-specification fluid in a separator to create a flashed gas stream and a flashed liquid stream; blending the streams from the flashed gas and a produced liquid, or a flashed liquid and a produced liquid to create an on-specification stream; where the blended components are modulated dependent upon the composition and physical properties of the produced off specification fluid, flashed gas, flashed liquid and the physical and chemical properties of the blended products. Further, other streams from the flashed gas, a produced gas, a flashed liquid, or a produced liquid may be blended to create additional on-specification streams.

In another embodiment, a process for treating produced fluids that are off-specification, when an off-specification fluid is received from one or more production wells; the off-specification fluid is heated to a first flashing temperature where components in the off-specification fluid will partially vaporize; the off-specification fluid is flashed in a separator to create a first gas stream and a first liquid stream; the first liquid stream is heated to a second flashing temperature; the first liquid stream is flashed to create a second gas stream and second liquid stream; a first on-specification product is blended from the first gas stream, second gas stream, first liquid stream, produced liquid, or combination thereof; and a second on-specification product is blended from the first gas stream, second gas stream, first liquid stream, produced liquid, or combinations thereof; where the blended components are modulated dependent upon the composition of the produced fluids, produced gas, and off-specification fluid.

In an additional embodiment, a process for treating produced fluids that are off-specification, when an off-specification fluid is received from one or more production wells; the off-specification fluid is heated to generate a heated off-specification fluid which is flashed in a separator to produce a first flashed gas and first flashed liquid product; the first flashed liquid fluid is heated to a second temperature where one or more components will vaporize; distilling the heated, two phase first flashed liquid fluid in a distillation column to create a condensate gas stream (fractionated condensate, naphtha rich), a light condensate liquid stream (side draw, pump around), and a bottom light oil stream; then blending the condensate gas stream, light condensate liquid stream, first flashed gas stream, bottom light oil stream, or a produced liquid to create an on-specification fluid streams, where the blended components are modulated dependent upon the composition and physical properties of the blended produced fluids.

The blended components may produce an on-specification blended stream consisting essentially of a condensate, a light gas condensate, a light oil condensate, a light oil, fuel gas, distillate, heater oil, or oil. The on-specification stream may be a gas of sufficient quality to deliver to said gas sales pipeline. The on-specification stream may also be a liquid of sufficient quality to deliver to said liquid sales pipeline or sales point.

TABLE 1

Abbreviations

| Abbreviation | Term |
|---|---|
| NGL | Natural Gas Liquid |
| CPF | Central Processing Facility |
| GCMS | Gas Chromatography/Mass Spectroscopy |
| SPL | Sales Pipe Line |
| WH | Water Hub |
| C1 | $CH_4$ |
| C2 | $C_2H_x$ |
| C3 | $C_3H_x$ |
| C4 | $C_4H_x$ |
| C5 | $C_5H_x$ |
| C# | $C_\#H_x$ |
| C2+ | Mixture comprising mostly C2 + heavier hydrocarbons |
| C5+ | Mixture comprising mostly C5 + heavier hydrocarbons |

Note that for hydrocarbon nomenclature, C #represents a hydrocarbon having #carbons and at least #hydrogens. C5 would be a hydrocarbon having 5 carbons and at least 5 hydrogens. Typically, a C5 hydrocarbon would have 5 carbons and 12 hydrogens, but may have fewer hydrogens if there are double bonds or one or more rings in the structure. Although C2+ and C5+ mixtures typically have heavier hydrocarbons mixed in, they may also have some lighter hydrocarbons in the mixture. Just as any hydrocarbon represented above may have some contamination of lighter and heavier hydrocarbons, and unless specified as having a specific purity (i.e. about 95%, 90%, 80%, etc.), petroleum fractions are presumed to be a mixture of hydrocarbons.

Raw liquids may contain lighter components from C1-C5, as well as Hexanes (C6); Heptanes (C7); Octanes (C8); Nonanes (C9); Decanes (C10); Undecanes (C11); Dodecanes (C12); Tridecanes (C13); Tetradecanes (C14); Pentadecanes (C15); Hexadecanes (C16); Heptadecanes (C17); Octadecanes (C18); Nonadecanes (C19); Eicosanes (C20); Heneicosanes (C21); Docosanes (C22); Tricosanes (C23); Tetrocosanes (C24); Pentacosancs (C25); Hexacosanes (C26); Heptacosanes (C27); Octacosanes (C28); Nonacosanes (C29); Triacontanes plus (C30+); Benzene ($C_6H_6$); Toluene ($C_7H_8$); Ethylbenzene, p+m Xylene ($C_5H_{10}$); o-Xylene ($C_8H_{10}$); 1, 2, 4, Trimethylbenzene ($C_9H_{12}$); Cyclopentane ($C_5H_{10}$); Methylcyclopentane ($C_6H_{12}$); Cyclohexane ($C_6H_{12}$); Methylcyclohexane ($C_7H_{14}$); and other components in a variety of mixtures.

Liquid properties for raw liquids from petroleum production may include a breakdown of the liquid components but only as normal paraffin components. Additional review may reveal the liquid components of a hydrocarbon fraction, for example C6 is itself a range of components. The same may be said for C7 components often described as "Heptanes" and this is because it is a range of components which boil between 70° C. and 98° C. In other words, the Heptanes could be the following components: n-Heptane formula 2-Methyl hexane ($C_7H_{16}$); 3-Methylhexane ($C_7H_{16}$); 3-Ethylpentane ($C_7H_{16}$); 2,2-Dimethylpentane ($C_7H_{16}$); 3,3-Dimethylpentane ($C_7H_{16}$); Triptane ($C_7H_{16}$); or other hydrocarbon comprising $C_7H_{16}$. The key issue is each of these components has a range of Boiling Points, Standard Densities and Kinematic Viscosities. However, the exact distribution of each of these fluids is not known. Although the exact distribution of properties may ultimately shift transport properties i.e. Standard Density (@15° C.) and Kinematic Viscosity (@7.5° C.). Consequently, estimating properties for a single component (C3, C4, C5, C6, C7, etc.) to represent a range of components requires accounting for the overall transport properties of a stabilized condensate product including the best liquid property data and back calculating the recombined gas and liquids to give the "Raw Effluent" fluid at separator operating pressure and temperature. In order to facilitate characterization, fluids may be grouped such as C7-C10, C11-C14, C15-C20, C21-C29 and C30+; or as C6-C10, C11-C15, C16-C20, C21-C25, C26-C30 and C31+. Depending upon the model and the level of accuracy required fluids may be paired (i.e. represented by odd values C5-C6, C7-C8, etc.), grouped by boiling ranges at a given pressure (i.e. <65° F., 65-155° F., 155-265° F., 265-350° F., 350-400° F., 400-500° F., 500-600° F., 600-650° F., 650-750° F., 750-900° F., 900-1000° F., >1000° F.) or by midpoint temperature (i.e. 112° F., 210° F., 308° F., 375° F., 450° F., 550° F., 625° F., 700° F., 825° F., 950° F., 1168° F.).

Example Values and Design Simulation values provided for various components and processes are often midpoints or moderate values that can have a large variation. The equipment and processes described herein are designed to work under various pressures, temperatures, volumes, and with a variety of products. Values provided are exemplary and may be varied dependent upon conditions.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A more complete understanding of the present invention and benefits thereof may be acquired by referring to the follow description taken in conjunction with the accompanying drawings.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

This process is a combination of unit operations (heat exchange, pumping, and separation) to produce an on-spec condensate product and heavier crude oil product, as well as side stream products that may be recovered for sales or used for blending of sales products. It does so by placing the feed under pressure and heating it to the point that it can be vaporized and separated (flashed). Further refinement of the flashed liquid by partially vaporizing and fractionating in an atmospheric distillation column produces a heavy (in terms of density and/or viscosity) product from the bottom of the column, a lighter naphtha rich product from the column overhead and an intermediate product from the column pump around side draw. Condensation of the vapor from the initial flash vessel (pre flash drum) and the distillation column overhead followed by blending with the side draw pump around product produces a low density, low viscosity naphtha rich diluent stream that can be blended with heavy stabilized condensate to produce an on specification sales condensate and/or blended with the column bottoms product to produce an on specification light oil product. In summary, by treating a heavy (in terms of density and/or viscosity) stabilized condensate product an on-specification condensate product and crude oil residual product are created.

Figure 1:
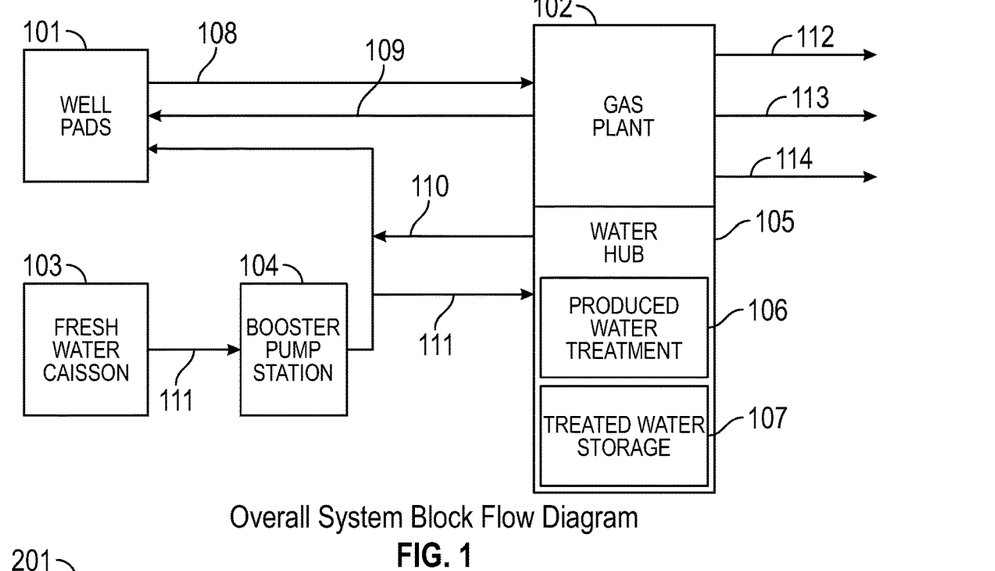
FIG. 1 depicts an Overall System Block Flow Diagram.

As shown in FIG. 1, a variety of facilities are incorporated to gather produced hydrocarbons from one or more reservoirs or a field of reservoirs. The following systems may be incorporated including Multi-Well Pads 101, Gathering Pipelines, Booster Pump Station(s) 104, a Gas Plant or Central Processing Facility (CPF) 102, Gas and/or Liquid Sales Pipelines (SPL), Water Hub (WH) 105 with Produced Water Treatment 106 & Treated Water Storage 107, optional Fresh Water Supply Pipeline, Water Booster Pump Station 104, Well Pad Fuel Gas Pipelines, Well Pad Treated Water Supply Lines, Disposal Infrastructure, One or more Storage Tanks, and the like. Although the system block flow diagram shows some features at specific locations, alternative configurations may be used dependent upon the equipment required, hydrocarbons produced, and sales lines available. The facilities may be permanent installations or temporary installations often determined by the equipment available and duration of use.

The example shown in FIG. 1, is but one representation of an overall field production system. The system may have Fresh Water source or caisson 103 at one location, Well Pads 101 located at another location, A Gas Plant or Central Processing Facility 102 at a third location and finally a Water Hub 105 at a fourth location. The various components are connected by pipes from the fresh water source to either the Well Pads 101 or the Water Hub 105, From the Well Pads 101 to the Central Processing Facility/Gas Plant 102, and from the Central Processing Facility/Gas Plant 102 to the Water Hub 105. This allows transport of water, Fuel Gas 109, and produced fluid as needed from the Central Processing Facility or Gas Plant 102 to the Well Pads 101, from the Fresh Water source or caisson 103 to the Well Pads 101 or Water Hub 105; and from the Water Hub 105 to the Well Pads 101 or Gas Plant/Central Processing facility as Frac Water 110, Fresh Water 111, or as brine or wastewater. Ultimately, products from Gas, Natural Gas Liquids, Liquids, and Condensates may be produced from the Produced Effluent 108 to be transported to various markets such as Gas Sales 112, NGL Sales 113, Condensate Sales 114, or other products through commercially owned transportation systems.

In one embodiment, the Well Pads 101 may have local facilities for producing the wells and for the blending of water and chemicals for fracking operations, enhanced oil recovery, well treatments, and the like. Raw production from the wells may include sour gas, gas, hydrocarbon liquids, and produced/flow back water. These produced materials are typically metered as they are produced and either stored at the well pad or transported directly to the CPF for processing. The Well Pads 101 may be supplied water, fuel, electricity, and other needs from the CPF or some materials may be delivered, stored on location, or provided via other sources.

In one embodiment, the CPF may process all incoming raw gas, hydrocarbon liquids and produced/flow back water to generate sales products such as sweet natural gas, NGL (C3+) and Condensate (C5+). The sales gas will be directed to the SPL system where NGL is metered and transferred to a SPL, Condensate products is pipelined to a condensate SPL. Produced/Flow back water from the CPF may be directed to a WH for treatment, storage, recycling, and/or disposal.

Figure 2:
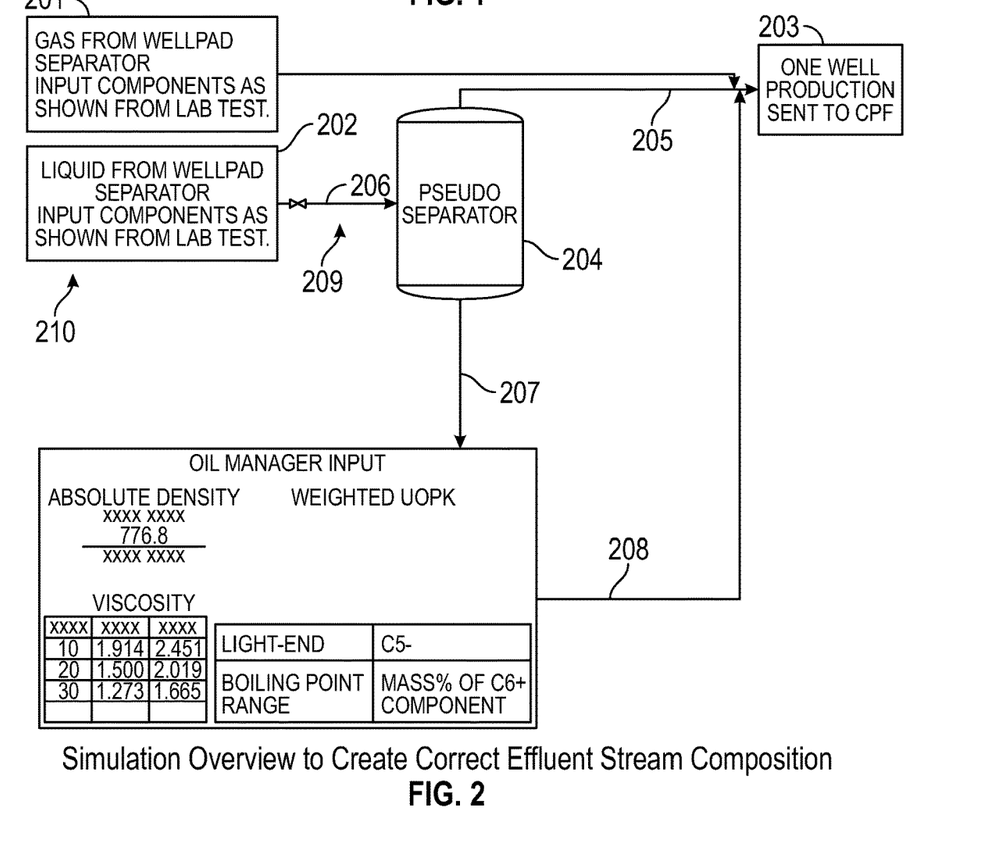
FIG. 2 shows a Simulation overview for Effluent Stream Composition.

FIG. 2 provides an overview of one possible effluent stream composition, although effluents may differ depending upon the location, type of reservoir, age of reservoir, treatments, and other factors. Effluent may come from one well or multiple wells depending upon location and type of well pad or pads present. Gas 201 and Liquid 202 are received from the well pad separator. Liquid from the well pad separator with a known Separator Conditions 210 modeled here as 20° C. with a pressure of 1765 kPag is transmitted through a Pseudo Letdown Valve 206 to Pseudo Separator Conditions 209 with a new temperature (calculated) and 0 kPag in the Pseudo Separator 204 which produces a Flashed Gas 205 and a Flashed Liquid 207. Properties of the Flashed Liquid 207 may be measured and entered into an Oil Manager which records Density, Viscosity, Boiling Point, and Mass % distribution of hydrocarbons characterizing amount of C5, C6, C7, C8 and other components. The Flashed Liquid with Pseudo Components 208, Gas From Well Pad 201, and Flashed Gas 205 may be blended or sent individually to a CPF 203.

Increases in produced fluid density have a cascading effect throughout the production process. Slightly heavier inlet liquids lead directly to an increase in Stabilized Condensate density. Increasing Stabilized Condensate density, may lead to increased loads on the Stabilizer Reboiler and Product Cooler. The material balance through the system may be shifted, leading to decreases in Stabilizer Recycle Compressor need. These changes in equipment demand and produced product lead to unpredictable needs and products.

The following examples of certain embodiments of the invention are given. Each example is provided by way of explanation of the invention, one of many embodiments of the invention, and the following examples should not be read to limit, or define, the scope of the invention.

One possible way to reduce grey "off spec" product is to convert the grey product into saleable product(s). A condensate stabilization system may be used to remove volatile components and dissolved gasses from the condensate to ensure compliance with product specifications for vapor pressure and/or volatile component concentrations. After stabilization, the condensate product will typically display a higher density and viscosity, and may no longer meet the product specification for sales condensate, typically dictated by a kinematic viscosity of <2 cSt at 7.5° C. measured by ASTM D 7042 and a standard liquid density of between 600 kg/m3 to 775 kg/m3 measured by ASTM D 4052. After stabilization, if the condensate product no longer meets the applicable sales condensate specification, further processing may be necessary to fractionate the whole stabilized condensate stream, or a fraction of the stabilized condensate stream, to produce a sales condensate product with a higher composition of lower molecular weight hydrocarbons, and a residual light oil product that is enriched in higher molecular weight hydrocarbons. The new system should be designed to maximize the Condensate production while keeping below the 2 cSt kinematic viscosity specification. Optimization can be used to reduce equipment loads and tower sizes. The condensate recovery unit may also incorporate stabilization of the live condensate product in place of or interlinked with the distillation column pre-flash function.

Example 1: Single Stage Heat and Flash

Figure 3:
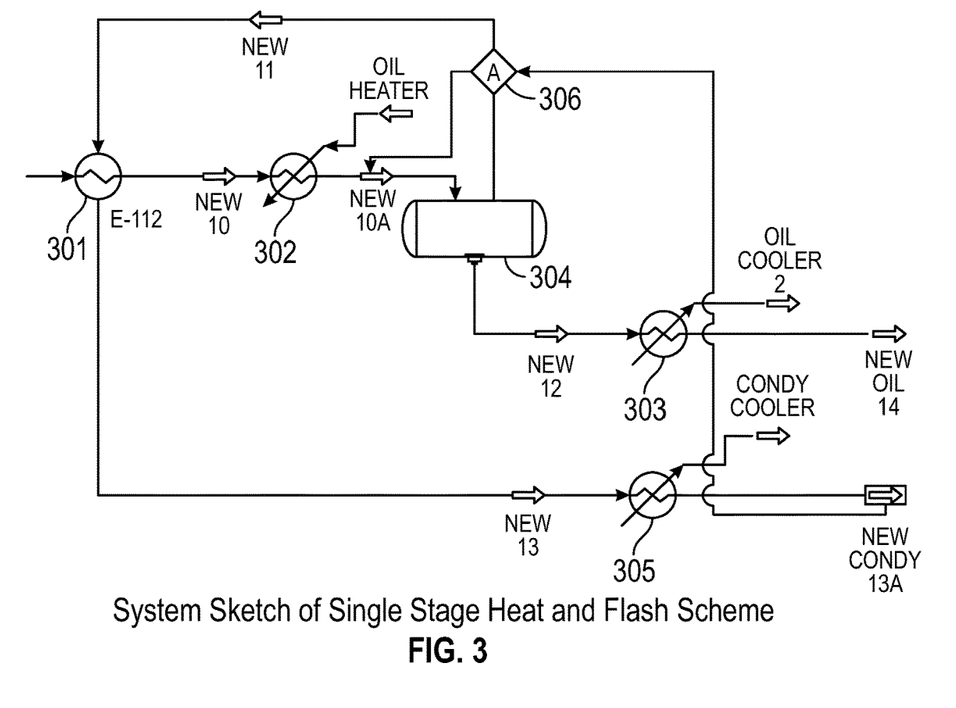
FIG. 3 demonstrates an example of a Single Stage Heat and Flash Scheme.

In this scheme the liquids are first heated to about 575° F. and then sent to a flash separator. The overhead "gas" stream is then condensed back down to produce the Light Condensate product. Whereas, the bottom liquid stream is cooled to produce the Light Oil product. FIG. 3 provides a system sketch of this scheme and Table 2 provides a summary of process parameters, equipment loads and sizing.

TABLE 2

Single Flash Configuration Summary

| Parameter | Units | Design Simulation |
|---|---|---|
| Process Streams Inlet Stream | | |
| Total HC Liquids | BPD | 18,180 |
| Inlet HC Liquids Std. Density | kg/m3 | 780.6 |
| Light Condensate Product | | |
| Flow | BPD | 13,120 |
| RVP | kpaa @ 37.8 C. | 64.6 |
| Std. Density | kg/m3 | 756 |
| Kinematic Viscosity (@7.5 C.) | cSt | 1.426 |
| Light Oil Product | | |
| Flow | BPD | 4863 |
| Std. Density | kg/m3 | 878.4 |
| Oil Fractionation System Feed/Condensate Exchanger | | |
| Duty | MMBtu/hr | 24.8 |
| UA | Btu/F-hr | 138,000 |
| Feed Fired Heater | | |
| Duty | MMBtu/hr | 42.5 |
| Flash Vessel 1 | | |
| Estimated Diameter | ft | 7.5 |
| Vessel Length | ft | 28 |
| Light Condensate Cooler | | |
| Duty | MMBtu/hr | 34.6 |
| Light Oil Product Cooler | | |
| Duty | MMBtu/hr | 19.4 |

As detailed in FIG. 3, initially produced fluid 310 enters a primary heat exchanger 301 that uses the incoming produced fluid to cool the top gas from the flash drum 304 to create Warm Produced Fluid 310 and cooled Light Condensate (New 13). The warmed produced fluid 311 is then transferred to a heat exchanger 302 which is heated via a primary heat exchanger that uses an Oil Heater. If the there is another source of excess heat, like a steam generator, equipment exhaust, or the like, another heat source may also be used to preheat or heat the produced fluid. The heated produced fluid 312 is then ejected into a flash drum 304 to produce an overhead gas stream 313 and a Light Oil bottom 314. The lighter overhead gas stream is transferred to the primary heat exchanger 301 where it is cooled to a Light Condensate 315. The Light Condensate 315 may be fed to an optional Condensate Cooler 305 also called a Condy Cooler to further reduce the temperature if required for the Light Condensate 317 for the Light Condensate SPL. Light Condensate 317 may be used to fuel the Oil Heater or added to the heated produced fluid 312 to precondition the Heated Produced Fluid 312. Finally, the Light Oil Bottom 314 is transferred to an optional Oil Cooler 303 to produce on-specification Light Oil 316 for the Light Oil SPL. Thus the off-spec or grey produced fluid can be efficiently converted to two saleable products—on-specification Light Oil 316 and Light Condensate 317—using only onsite fluids.

Example 2: Two-stage Heat and Flash

Figure 4:
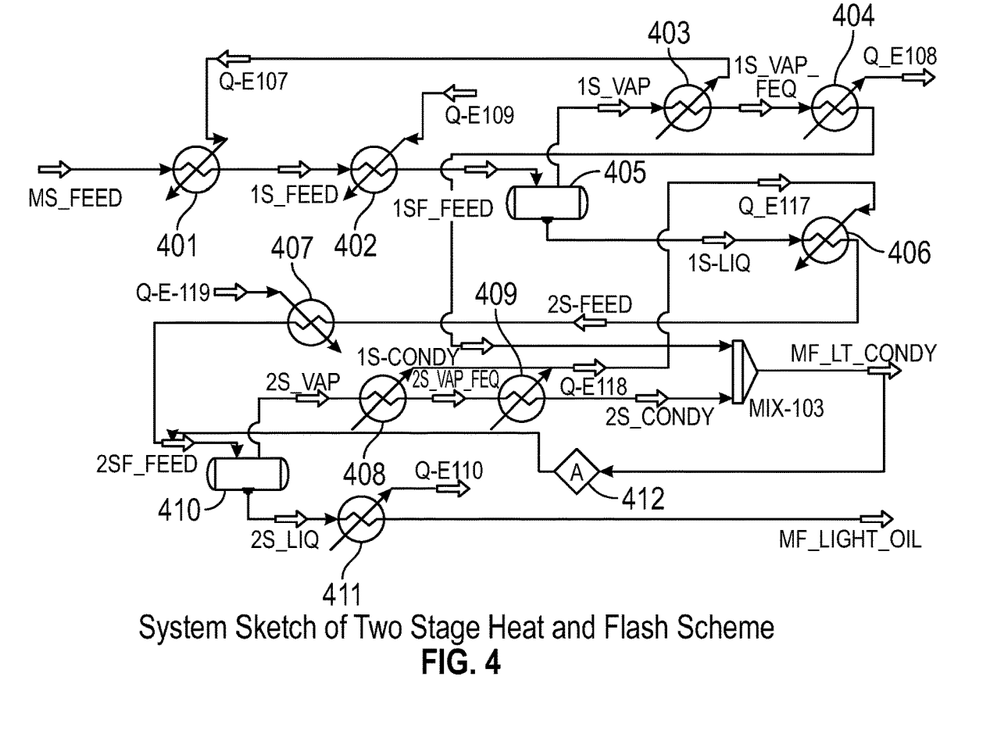
FIG. 4 demonstrates an example of a Two Stage Heat and Flash Scheme.

The next iteration utilized a Two-stage Heat and Flash scheme with some cross exchangers to minimize external heat inputs. This scheme is unique in that it provides 3 product coolers and 2 external heaters. This type of system can produce approximately 12,430 BPD of Light Condensate and 5500 BPD of Light Oil. As above, FIG. 4 provides a system sketch of this scheme and Table 3 provides a summary of process parameters, equipment loads and sizing.

TABLE 3

Two Stage Flash Configuration

| Parameter | Units | Design Simulation |
|---|---|---|
| Process Streams Inlet Stream | | |
| Total HC Liquids | BPD | 18,180 |
| Inlet HC Liquids Std. Density | kg/m3 | 780.6 |
| Light Condensate Product | | |
| Flow | BPD | 13,100 |
| RVP | kpaa @ 37.8 C. | 65.06 |
| Std. Density | kg/m3 | 756.6 |
| Kinematic Viscosity (@7.5 C.) | cSt | 1.456 |
| Light Oil Product | | |
| Flow | BPD | 4908 |
| Std. Density | kg/m3 | 872.5 |
| Oil Fractionation System | | |
| Feed/Condy Exchanger 1 | | |
| Duty | MMBtu/hr | 13.6 |
| UA | Btu/F-hr | 24,200 |
| Feed Fired Heater 1 | | |
| Duty | MMBtu/hr | 17.4 |
| Flash Vessel 1 | | |
| Estimated Diameter | ft | 10 |
| Vessel Length | ft | 35 |
| Feed/Condy Exchanger 2 | | |
| Duty | MMBtu/hr | 22.9 |
| UA | Btu/F-hr | 191,000 |
| Feed Fired Heater 2 | | |
| Duty | MMBtu/hr | 31.9 |
| Flash Vessel 2 | | |
| Estimated Diameter | ft | 7 |
| Vessel Length | ft | 24 |
| Light Condensate Cooler | | |
| Duty | MMBtu/hr | 36.9 |
| Light Oil Product Cooler | | |
| Duty | MMBtu/hr | 22.3 |

As shown in FIG. 4, the Production Fluid (MS_Feed) and a hot feed (Q-E107) enters a primary heat exchanger 401 to create a Warm Production Feed (1S_Feed). The Warm Production Feed (1S_Feed) is then heated via a First Hot Oil Heater 402. The Heated Production Feed (1SF_Feed) is then flashed in a First Flash Drum (1S_Flash), to create a First Bottom Feed (1S_Liq) and a First Gas Feed (1S_Vap). The First Gas Feed (1S_Vap) is cooled via a Second Heat Exchanger 403 to create a Hot Feed (Q-E107) and a cooler Gas Feed (1S_Vap_FEQ). The cooler Gas Feed is then cooled via a Condensate Cooler 404 to generate a First Condensate Feed (1S_Condy) that is fed with other Condensate Feeds into a Compressor (MX-103) to create an on-specification Light Condensate (MF_Light_Oil). The First Bottom Feed 405 is heated (QE-117) in a third heat exchange 406 which uses overhead heat from the Second Flash Drum 410 to preheat incoming Light Condensate (1S_Liq) to create a Warm Light Condensate (2S_Feed). The Warm Light Condensate (2S_Feed) is heated using a Second Hot Oil Heater 407 to create a Hot Light Condensate (2S_Feed). The Hot Light Condensate (2S_Feed) is mixed with an adjusted 412 Condensate Conditioner (MF_Lt_Condy) and then flashed in a Second Flash Drum 410 to create a Second Condensate Feed (2S_Vap) and a Light Oil Bottom (2S_Liq). Heat from the Second Condensate Feed Gas (2S_Vap) is removed in a heat exchange 408 and condenser 409 to produce a Second Condensate Feed Liquid (2S-Condy) that is fed with other Condensate Feeds into a Compressor (MX-103) to create an on-specification Light Condensate (MF_Light_Oil). Finally, the Light Oil Bottom (2S_Liq) is transferred to an optional Oil Cooler 411 to produce on-specification Light Oil (MF_Light_Oil) for the Light Oil SPL. Thus the off-spec or grey produced fluid (MS_Feed) can be efficiently converted to two saleable products-on-specification Light Oil (MF_Light_Oil) and Light Condensate (MF_Lt_Condy)-using only onsite fluids.

Example 3: Distillation Column Separation

Figure 5:
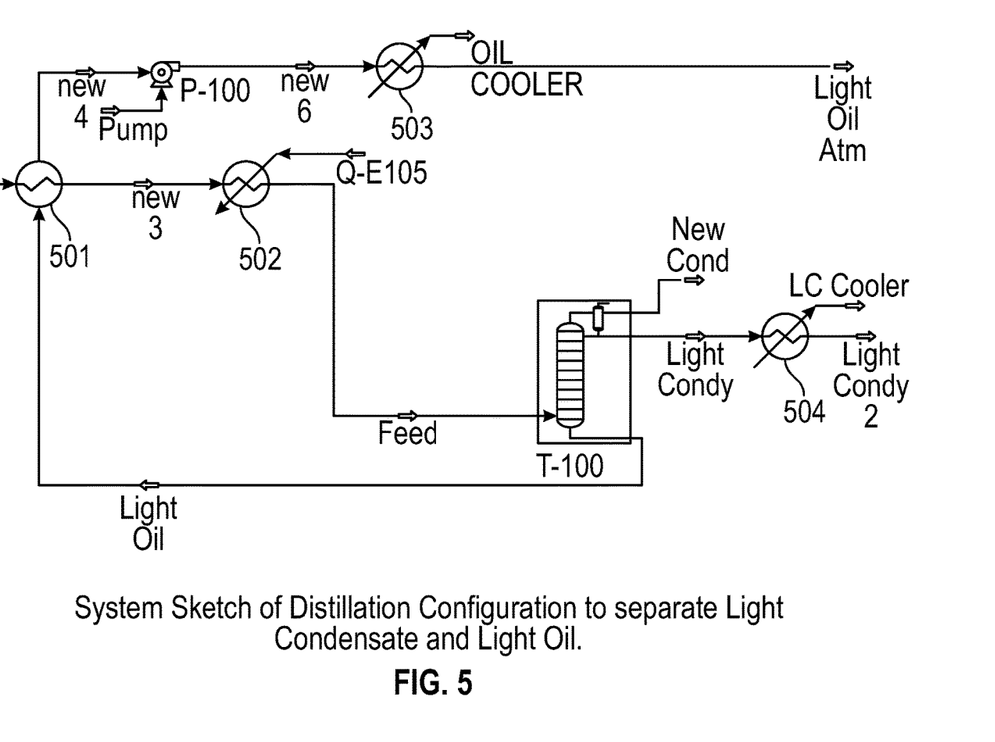

Additionally, a distillation column may be used to separate the Light Condensate from the Light Oil. The column design basis was to produce approximately 13,000 BPD of Light Condensate and about 5000 BPD of Light Oil. FIG. 5 provides an overview of the system and Table 4 provides a summary of process parameters, equipment loads and sizing.

TABLE 4

Distillation Tower Configuration Summary

| Parameter | Units | Example Values |
|---|---|---|
| Process Streams Inlet Stream | | |
| Total HC Liquids | BPD | 18,180 |
| Inlet HC Liquids Std. Density | kg/m3 | 780.6 |
| Light Condensate Product | | |
| Flow | BPD | 13,100 |
| RVP | kpaa @ 37.8 C. | 64.7 |
| Std. Density | kg/m3 | 756.1 |
| Kinematic Viscosity (@7.5 C.) | cSt | 1.431 |
| Light Oil Product | | |
| Flow | BPD | 4916 |
| Std. Density | kg/m3 | 875 |
| Oil Fractionation System | | |
| Feed/Bottoms Exchanger | | |
| Duty | MMBtu/hr | 17 |
| UA | Btu/F-hr | 159,000 |
| Feed Fired Heater | | |
| Duty | MMBtu/hr | 55 |
| Distillation Tower Tower | | |
| Number of Trays | | 5 |
| Estimated Diameter | ft | 6 and 7 |
| Reflux Ratio | | 5 |
| Condenser Duty | MMBtu/hr | 53.3 |
| Light Oil Pump | | |
| Duty | bhp | 10 |
| Light Oil Product Cooler | | |
| Duty | MMBtu/hr | 4.1 |

FIG. 5 demonstrates an incoming Produced Fluid and a Light Oil bottom enter a Heat Exchange 501 to produce a cooled Light Oil (New 4) and a Warm Produced Fluid (New 3). The Warm Produced Fluid (New 3) is then heated in a Hot Oil Heater 502 to produce a Hot Produced Feed (Feed). The Hot Produced Feed (Feed) then enters the Distillation Column (T-100) to produce a Top Gas (New Cond), Light Condensate Fraction (Light Condy), and a Light Oil Fraction (Light Oil). The Top Gas enters a Demisting Tank to remove any liquids which are discharged into the Light Condensate Fraction (Light Condy). The Light Condensate Fraction is cooled in a Light Condensate Cooler (LC Cooler) to produce an on-specification Light Condensate for the Light Condensate SPL. The Light Oil Fraction (Light Oil) is used in Heat Exchanger 501 to warm the Produced Fluid creating a Cool Light Oil (New 4) and a Warm Produced Fluid (New 3). The Cool Light Oil is pressurized using a pump (P-100) to create a Pressurized Light Oil (New 6). The Pressurized Light Oil is cooled in a Light Oil Cooler 503 to create an on-specification Light Oil (Light Oil Atm) for the Light Oil SPL. Thus the off-spec or Grey Produced Fluid (unlabeled) can be efficiently converted to two saleable products-on-specification Light Oil (Light Oil Atm) and Light Condensate (Light_Condy)-using only onsite fluids.

Figure 6:
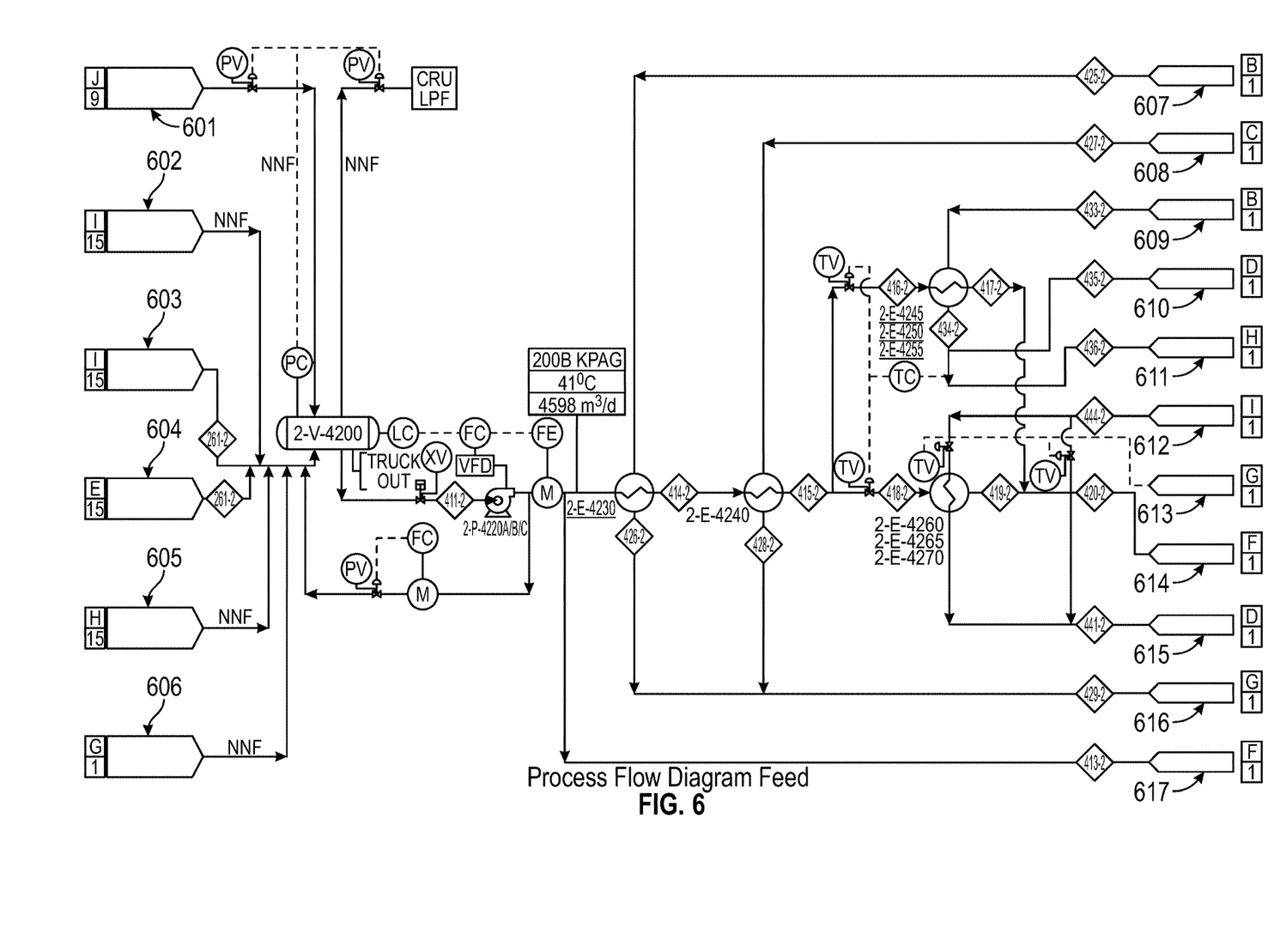
FIG. 6 is a process flow diagram of a CRU Feed.

As shown in FIG. 6, a large number of effluent inputs can be used to derive a variety of commercial products dependent upon blending and purity. Inputs include Blanket Gas 601, Off Spec Condensate 602 from phase 1 condensate booster pumps, Condensate 603 from phase 2 stabilization unit, condensate 604 from phase 1 stabilization unit, Hydrocarbon Liquids 605 from the close hydrocarbon drain drum, and Condensate Recycle 606 from the blending skid. The effluents are used to produce a variety of products for use including Preflash Vapor 607 from the condensate fraction tower, Overhead Vapor 608 from the condensate fraction tower, Top Pumparound from the condensate fraction tower, Top Pumparound Return 610 to the condensate fraction tower, Preflash Overhead Vapor 611 to the top pumparound product cooler, Fractionated Light Oil 612 from the condensate fraction tower, Signal 613 from the TC preflash drum, Condensate 614 to the preflash drum, Fractionated Light Oil 615 to the fractionated light oil cooler, Preflash Overhead Vapor 616 to the overhead condenser, and Clean Condensate to the blending skid.

Figure 7:
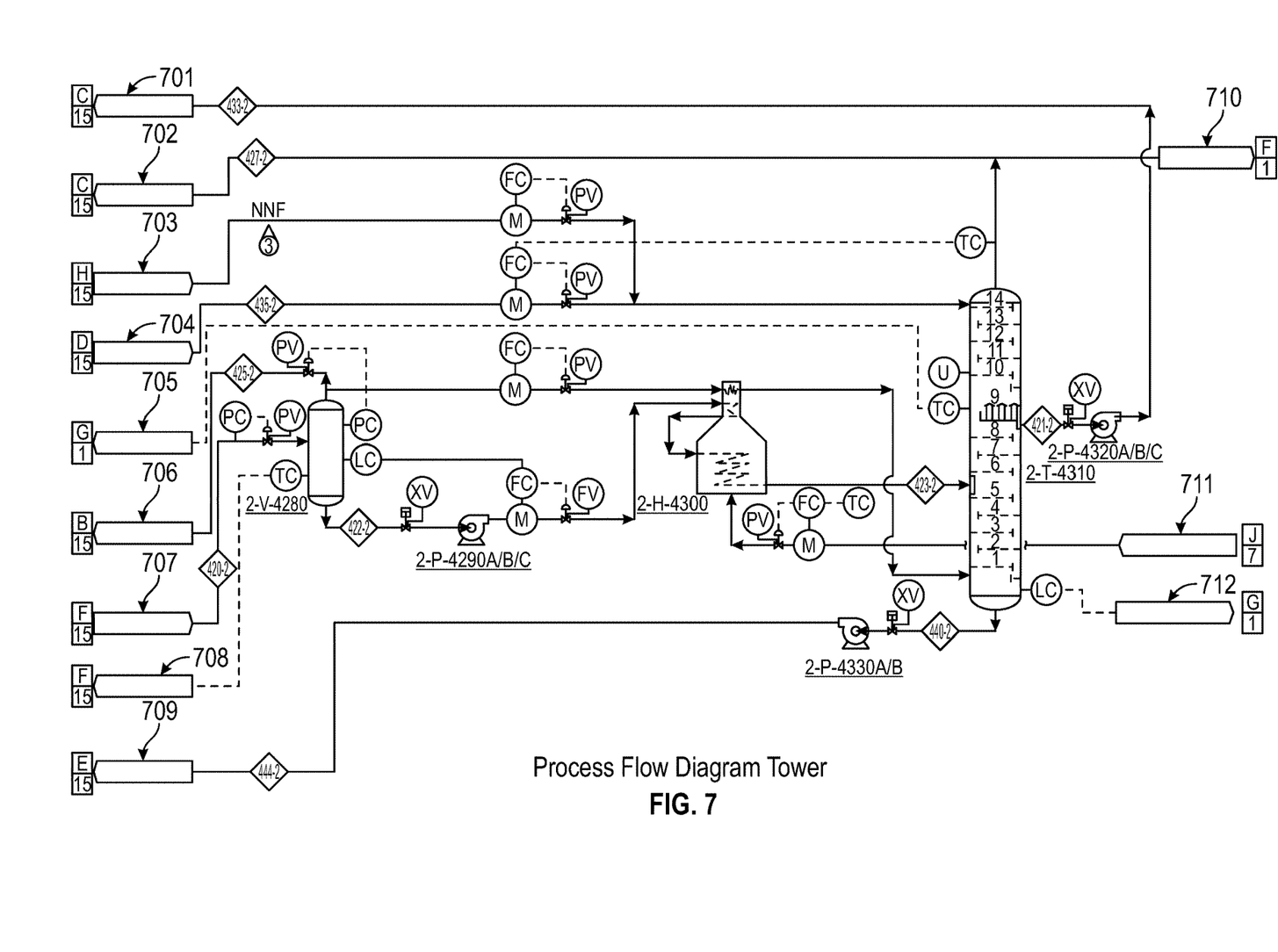
FIG. 7 is a process flow diagram of a CRU Tower.

FIG. 7 shows a process flow diagram of a CRU Tower using a fractionating tower to generate a variety of fluids for sales and use through the process. Overhead Vapor 702 for vapor exchange, Reflux 703 from overhead drum, Top Pumparound 701 is fed to the Top Pumparound Return 704. Preflash Vapor 706 is transferred to the condensate/preflash vapor exchanger. Condensate 707 from a variety of sources including condensate exchangers is transferred to a flash drum (2-V-4280), bottoms are pumped (2-P-4290A/B/C) to a heater (2-H-4300) or heat exchanger which enters fractionation column (2-T-4310) in the middle, while Top Pumparound Return enters at the top of the column (2-T-4310). Preflash vapor may be diverted or transferred through the heat exchanger (2-H-430) before entering the bottom of the fractionation column (2-T-4310). Top Pumparound 701 is removed from the middle of the column (2-T-4310) pumped (2-P-4320A/B/C), mixed with Reflux 703 and returned to the top of column (2-T-4310). Fractionated Light Oil 709 is removed from the bottom of column (2-T-4310). Overhead Vapor 702 is transferred along with other overhead gases to a Hot Vapor Bypass 710. Fuel Gas 711 from a variety of sources may be used in Heater (2-H-4300). Signals are used to monitor equipment in the process including the Top Column Signal 705 to pumparound product control valve, Flash Drum Bottom Signal 708 to fractionated light oil exchanger control valves, and Bottom Column Signal 712 to bottoms level control valve. Thus a variety of condensate effluents can be separated into a Hot Vapor Bypass 710 and Fractionated Light Oil 709 with a heated vapor used to heat the column.

Figure 8:
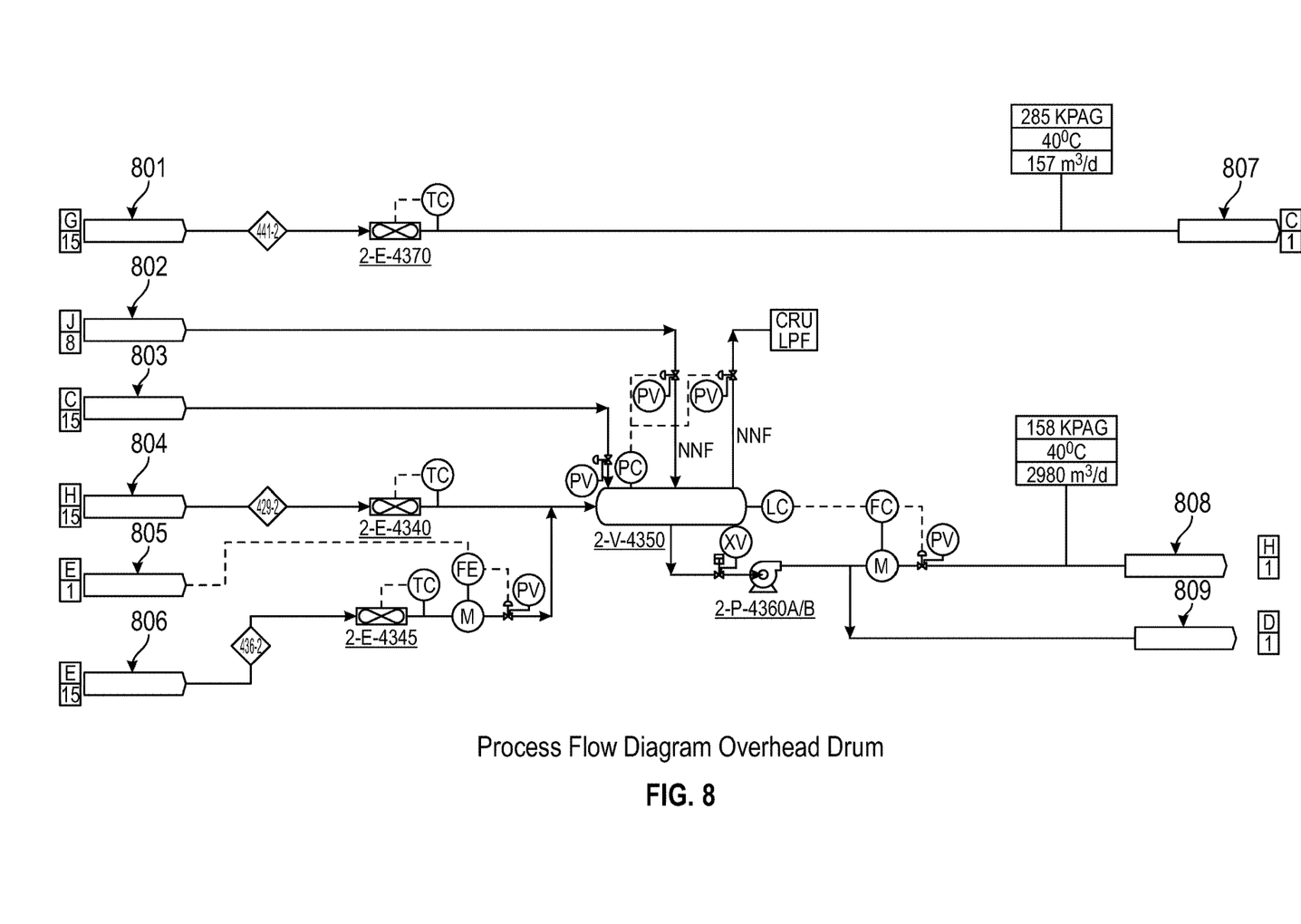
FIG. 8 is a process flow diagram of a CRU Overhead Drum.

In FIG. 8, Fractionated Light Oil 801 from a variety of sources may be brought to a light oil cooler (2-E-4370) and cooled to 40° C., 285 kPag, and 157 m$^3$/d for the Light Oil Blending Skid 807. Blanket Gas 802, Hot Vapor Bypass 803, Preflash Overhead Vapor 804 from condensate exchangers, and Preflash Overhead Vapor 806 enter the Overhead Drum (2-V-4350). Vapors from the Overhead Drum (2-V-4350) can be transferred to the CRU Light Fuel (CRU LPF) for use as a fuel gas in heaters and other equipment. Bottomps are pumped (2-P-4360A/B) to the blending skid as a Fractionated Light Condensate 808 or used for Reflux 809 in the condensate fractionation tower (FIG. 7). A Signal 805 from the condensate fractionation tower top pumparound (FIG. 7) informs flow rate and volume from the Overhead Drum (2-V-4350).

Figure 9:
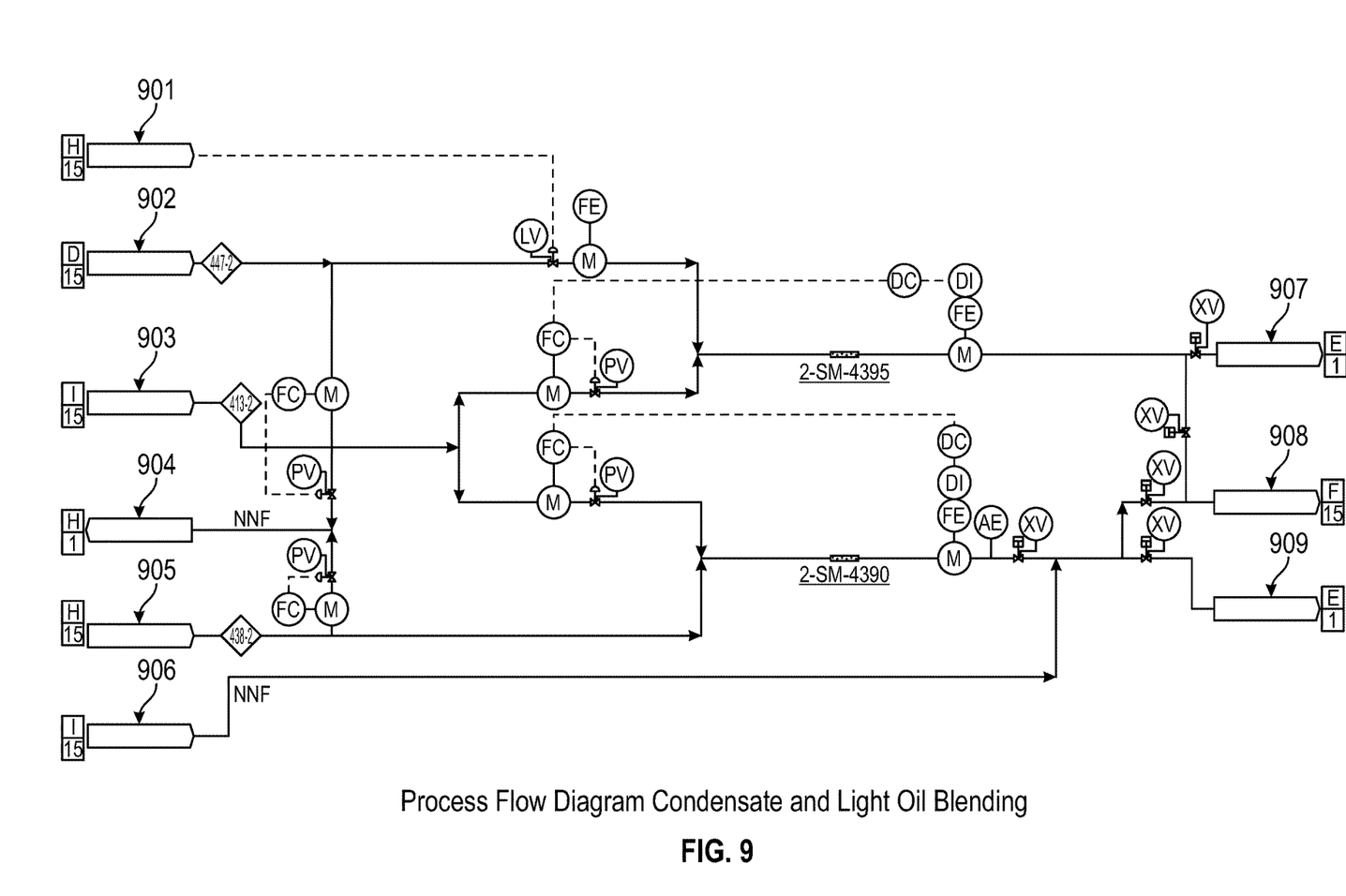
FIG. 9 is a process flow diagram of a Condensate/Light Oil Blending skid.

FIG. 9 demonstrates Condensate and Light Oil blending to achieve a variety products that are on specification. Fractionated Light Oil 902, Condensate 903, Condensate Recycle 904, Fractionated Condensate 905, and Condensate Bypass 906 are blended to generate Light Oil 907 for sales, Condensate 908 for storage, and Condensate 909 for product sales. By controlling the rate and amount of blending, not only can sales products be produced, but all fluids and fuels required for operation can be generated on site. The fluids may be cooled, pressurized, blended, and filtered, to generate a sufficiently clean product that be delivered through available sales feeds.

Example 4: Metered

In another embodiment, the produced fluid is monitored using an inline meter. The inline meter may be a Spectrophotometer, GCMS, and/or another analyzer may be used. Additionally, identifying production rates from a variety of individual wells or well pads that feed into the CPF may be used to estimate the amount of grey product produced. In this way, the amount of fluids passed through one of the previously demonstrated facilities may be increased or decreased dependent upon need. In one embodiment, a Grey Produced Fluid and a New Oil are mixed to create an on-specification Light Oil. In another embodiment a Grey Produced Fluid and a New Condy are mixed to create an on-specification Light Condensate. By characterizing all necessary "Representative Samples" blending evaluations can be used to determine both the produced fluid along with blending fluids that may shift the produced fluid from a grey fluid to a desired product.

As production is increased, new wells, and new well pads are added to the CPF, the overall mix may be changed dynamically. This coupled with decreasing production rates and changing products in over the life of each well creates a situation where the produced fluid composition cannot be guaranteed throughout the life of the field. By optimizing the rate of flash drum or distillation, the use of an oil heater can be minimized formulaically to reduce fuel oil use while maximize on-specification product production and rates.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

In one embodiment a spectrophotometer, gas analyzer, GCMS, or other tool may be used to characterize the presence and need for blending or changes in flash temperature. By monitoring produced fluid properties, the flash drum temperature may be adjusted, produce fluid can be compensated for, and blending agents may be adjusted to shift the produced fluid from light oil to produce a Condensate Product stream which may be sold to one or more commercial pipelines.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. CA2904901 (Ploeger, et al.). "Membrane Separation of Carbon Dioxide from Natural Gas with Energy Recovery." 2016
2. U.S. Pat. No. 6,357,526 (Abdel-Halim, et al.). "Field Upgrading of Heavy Oil and Bitumen" (2002).

The invention claimed is:

1. A process for treating produced fluids that are off specification where the process comprises:
   a) receiving a gas feed stream and a liquid feed stream from one or more production wells wherein said liquid feed stream comprises effluent from one or more wells;
   b) heating said liquid feed stream to a first flashing temperature wherein one or more components in said liquid feed stream will vaporize;
   c) flashing said liquid feed stream in a pseudo-separator to create a flashed gas stream and a flashed liquid stream;
   d) blending one or more streams selected from the gas feed stream, the flashed gas stream, the flashed liquid stream, and the liquid feed stream to create a first on-specification liquid stream;
   e) blending one or more streams selected from the gas feed stream and a flashed gas, to create an on-specification gas stream; and
   f) providing said on-specification liquid stream to a liquid sales pipeline and said on-specification gas stream to a gas sales pipeline
   wherein one or more streams are modulated during blending dependent upon the composition of the liquid feed stream, gas feed stream, flashed gas stream and flashed liquid stream;
   wherein said liquid feed stream is heated in a heat exchanger with said flashed gas stream or flashed liquid stream.

2. The process according to claim 1, wherein said first on-specification liquid stream consists essentially of a condensate, a natural gas liquid, a fuel gas, or an oil.

3. The process according to claim 1, wherein said on-specification gas stream is a gas of sufficient quality to deliver to a natural gas sales pipeline.

4. The process according to claim 1, wherein said on-specification liquid stream is a liquid of sufficient quality to deliver to a crude oil oil, a natural gas liquids, or a condensate sales pipeline.

5. The process according to claim 1, where the process further comprises:
   i) following step (c), heating the flashed liquid stream to a second flashing temperature;
   ii) flashing said flashed liquid stream to create a second flashed gas stream and second flashed liquid stream;
   iii) blending one or more streams selected from the gas feed stream, flashed gas stream, second flashed gas stream, liquid feed stream, flashed liquid stream, and second flashed liquid stream to create a second on-specification liquid stream
   wherein:
   said one or more streams are modulated during blending dependent upon the composition and measured physical properties of the gas feed stream and liquid feed stream.

6. A process for treating produced fluids that are off-specification where the process comprises:
   a) receiving a gas feed stream and a liquid feed stream from one or more production wells;
   b) heating said liquid feed stream to a first flashing temperature wherein one or more components in said liquid feed stream will vaporize;
   c) flashing said liquid feed stream in a pseudo-separator to create a flashed gas stream and a flashed liquid stream;
   d) heating the flashed liquid stream to a second flashing temperature;
   e) flashing said flashed liquid stream to create a second flashed gas stream and second flashed liquid stream
   f) blending one or more streams selected from the gas feed stream, the flashed gas stream, the second flashed gas stream, the liquid feed stream, the flashed liquid stream, the second flashed liquid stream, and combinations thereof to create a first on-specification product; and
   g) blending one or more streams selected from the gas feed stream, the flashed gas stream, the second flashed gas stream, and combinations thereof to create a second on-specification product wherein said one or more streams are modulated during blending dependent upon the composition and measured physical properties of the liquid feed stream and gas feed stream,
   wherein a liquid feed stream is heated in a heat exchanger with a flashed gas stream, second flashed gas stream, flashed liquid stream, second flashed liquid stream, or a combination thereof.

7. The process according to claim 6, wherein said first on-specification product consists essentially of a condensate, natural gas liquid, fuel gas, or oil.

8. The process according to claim 6, wherein said second on-specification stream is a gas of sufficient quality to deliver to a gas sales pipeline.

9. The process according to claim 6, wherein said first on-specification stream is a liquid of sufficient quality to deliver to a liquid sales pipeline.

10. A process for treating produced fluids that are off-specification where the process comprises:
 a) receiving a gas feed stream and a liquid feed stream from one or more production wells;
 b) preheating said liquid feed stream to generate a heated liquid feed stream;
 c) heating said heated liquid feed stream to a second temperature wherein one or more components in said liquid feed stream vaporize;
 d) distilling said heated liquid feed stream in a distillation column to create a condensate gas stream, a condensate liquid stream, and a bottom oil stream; and
 e) blending one or more streams selected from the condensate gas stream, condensate liquid stream, bottom oil stream, gas feed stream, or liquid feed stream to create one or more on-specification liquid streams, on-specification gas streams or both on-specification liquid streams and on-specification gas streams,
 wherein said one or more streams are modulated during blending dependent upon the composition of the liquid feed stream and gas feed stream.

11. The process according to claim 10, wherein said liquid feed stream is preheated in a heat exchanger with, the condensate gas stream, the condensate liquid stream, or the bottom oil stream.

12. The process according to claim 10, wherein said on-specification liquid stream consists essentially of a condensate, a natural gas liquid, a fuel gas, or an oil.

13. The process according to claim 10, wherein said on-specification gas stream is a gas of sufficient quality to deliver to a gas sales pipeline.

14. The process according to claim 10, wherein said on-specification liquid stream is a liquid of sufficient quality to deliver to a liquid sales pipeline.

* * * * *